(12) United States Patent
Xie et al.

(10) Patent No.: US 12,541,913 B2
(45) Date of Patent: Feb. 3, 2026

(54) METHOD AND APPARATUS FOR REBUILDING RELIGHTABLE IMPLICIT HUMAN BODY MODEL

(71) Applicant: ZHEJIANG LAB, Hangzhou (CN)

(72) Inventors: Rengan Xie, Hangzhou (CN); Rong Li, Hangzhou (CN); Yuchi Huo, Hangzhou (CN); Sen Yang, Hangzhou (CN); Yizheng Chen, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 267 days.

(21) Appl. No.: 18/290,332

(22) PCT Filed: May 19, 2023

(86) PCT No.: PCT/CN2023/095248
§ 371 (c)(1),
(2) Date: Nov. 13, 2023

(87) PCT Pub. No.: WO2024/148732
PCT Pub. Date: Jul. 18, 2024

(65) Prior Publication Data
US 2025/0086885 A1    Mar. 13, 2025

(30) Foreign Application Priority Data
Jan. 10, 2023    (CN) .......................... 202310035290.2

(51) Int. Cl.
*G06T 15/50*    (2011.01)
*G06N 3/045*    (2023.01)
(Continued)

(52) U.S. Cl.
CPC .......... *G06T 15/506* (2013.01); *G06N 3/045* (2023.01); *G06T 13/40* (2013.01); *G06T 17/00* (2013.01);
(Continued)

(58) Field of Classification Search
CPC ......... G06T 13/40; G06T 15/00; G06T 15/50; G06T 15/506; G06T 15/55; G06T 17/00; G06T 19/20; G06N 3/045
See application file for complete search history.

(56) References Cited

U.S. PATENT DOCUMENTS

2015/0178988 A1    6/2015    Montserrat Mora et al.

FOREIGN PATENT DOCUMENTS

| CN | 113112592 | 7/2021 |
| CN | 113421328 | 9/2021 |
| CN | 115147559 | 10/2022 |

*Primary Examiner* — King Y Poon
*Assistant Examiner* — Vincent Peren
(74) *Attorney, Agent, or Firm* — Jiwen Chen; Joywin IP Law PLLC

(57) ABSTRACT

The present invention discloses a method and an apparatus for rebuilding a relightable implicit human body model. A human body is represented as a deformable implicit neural representation, and a geometric shape, material attributes, and ambient lighting of the human body are decomposed to obtain a relightable and drivable implicit human body model. In addition, a volumetric lighting grid including a plurality of spherical Gaussian models is introduced to represent complex lighting with spatial variation, and visible probes capable of changing in position with change in human pose are introduced to record dynamic self-occlusion caused by human motion. With the method, drivable implicit models capable of being used for high-fidelity human body relighting may be generated in cases of sparse video input and even monocular input.

14 Claims, 6 Drawing Sheets

(51) Int. Cl.
*G06T 13/40* (2011.01)
*G06T 17/00* (2006.01)
*G06T 19/20* (2011.01)

(52) U.S. Cl.
CPC ...... *G06T 19/20* (2013.01); *G06T 2219/2004* (2013.01)

METHOD AND APPARATUS FOR REBUILDING RELIGHTABLE IMPLICIT HUMAN BODY MODEL

This is a U.S. national stage application of PCT Application No. PCT/CN2023/095248 under 35 U.S.C. 371, filed May 19, 2023 in Chinese, claiming priority of Chinese Application No. 202310035290.2, filed Jan. 10, 2023, all of which are hereby incorporated by reference.

TECHNICAL FIELD

The present invention belongs to the technical field of human body rebuilding and relighting, and particularly relates to a method and an apparatus for rebuilding a relightable implicit human body model.

BACKGROUND TECHNOLOGY

Virtual digital humans refer to virtual characters created by computer graphics, graphics rendering, motion capture and other technologies that exist in a non physical world and have digital appearances. With the development of artificial intelligence technology and the proposal of metaverse concept, virtual digital humans have expanded from early pan-entertainment to finance, cultural tourism, medical treatment, retail and other fields, and have realized the functions of real human virtual avatars, thereby being gradually applied commercially in the field of AI virtual digital humans. How to quickly build and obtain digital humans, especially digital human avatars corresponding to real characters, has become a rigid demand. The technology for building digital humans has long been applied in the film and television industry, but existing methods are costly and time-consuming, and the cost of millions of fees hinders the application of the digital humans to the mass market.

At present, there are mainly three ways of modeling virtual digital humans, which are pure artificial modeling, modeling with acquisition devices, and modeling with artificial intelligence in sequence according to the degree of artificial participation, and related software and hardware are involved, including modeling software, driver software, rendering engines, shooting and acquisition devices, optical devices, display devices and so on. The first way of pure artificial modeling has high modeling quality and good effect, but high cost and low production capacity. The second way of modeling with acquisition devices is moderate in cost and wide in application. Specifically, model data is acquired using an external scanning device. A data input mode is roughly divided into two-camera array scanning and dynamic light field reconstruction. The way of building digital humans with devices has a short production cycle and saves manpower, and can meet the modeling requirements of most virtual humans. However, the devices are complex and costly, and a fixed site is required. The third way is full-automatic modeling with artificial intelligence. With these methods, human body prior knowledge and human body parametric models are built with known human body data sets, and the complete human body model is estimated with video and image inputs. Recently, the development of implicit object representation technology such as NeRF, and neural rendering technology has overcome the shortcomings of fixed human topology and simple geometry of conventional rebuilding methods, and improves the quality of human body rebuilding while maintaining low cost.

With the improvement of artificial intelligence technology, the human body rebuilding method based on artificial intelligence is expected to become the mainstream method in the future. In the prior art, Animatable NeRF, Human NeRF, Neural Actor and the like work to predict residual skin weights and residual deformations by using a skinned multi-person linear (SMPL) model and an additional neural network to establish mapping of points on a human body from a pose space to a standard space, in order to learn a deformable human body representation based on NeRF. However, these methods only record the appearance of a character under fixed lighting conditions, regardless of a material of the human body and ambient lighting where the character is located, so the task of relighting cannot be implemented. Relighting4D takes into account the surface material while implementing the human body rebuilding, and achieves the relighting effect. However, Relighting4D assumes that all parts of the human body have the same surface roughness, and sets the ambient lighting for the character as a monochromatic grayscale image. Moreover, Relighting4D is unable to produce a high-quality relighting result.

Therefore, it is necessary to provide a low-cost, drivable and high-quality method for rebuilding a human body based on sparse video input, which supports relighting of the human body.

SUMMARY OF INVENTION

In view of the above technical problems, an object of the present invention is to provide a method and an apparatus for rebuilding a relightable implicit human body model, which rebuild a drivable and relightable implicit human body model using a multi-viewpoint sparse video as an input.

To achieve the above object of the invention, an embodiment provides a method for rebuilding a relightable implicit human body model, including the following steps:

obtaining spatial points in a pose space based on sparse video frames, and mapping the points in the pose space back to a standard T-Pose space by using a neural skin module;

calculating implicit signed distance field values and implicit apparent eigenvectors of the points according to spatial points in the standard T-Pose space by using a neural signed distance field module;

calculating normal directions and volume densities of the spatial points according to the implicit signed distance field values of the points so as to obtain geometric information of a human body;

calculating material information of the spatial points according to the implicit apparent eigenvectors by using a bidirectional reflectance distribution function (BRDF) representation module, and converting the material information of the spatial points into material information of curved surface points of the human body;

introducing visible probes to record visibility information of each pose from a surface of the human body to a surrounding light source; representing ambient lighting information by a volumetric lighting grid including spherical Gaussian models; and forming an implicit human body model by the geometric information of the human body, the material information of the curved surface points of the human body, the visibility information, and the ambient lighting information.

In an embodiment, the mapping the points in the pose space back to a standard T-Pose space by using a neural skin module includes:

obtaining basic skin weights by using a skinned multi-person linear (SMPL) template, and calculating residual skin weights according to the spatial points in the pose space and a first hidden variable that needs to be learned and optimized by using a first neural network; and calculating a final skin weight for each of the video frames according to the basic skin weights and the residual skin weights, and mapping the spatial points in the pose space back to the standard T-Pose space by using the final skin weight and a transformation matrix, to obtain spatial points in the standard T-Pose space.

In an embodiment, the calculating implicit signed distance field values and implicit apparent eigenvectors of the points according to points in the standard T-Pose space by using a neural signed distance field module includes:

calculating output hidden vectors according to the spatial points in the standard T-Pose space by using a second neural network, and extracting one-dimensional vectors from the hidden vectors to serve as the implicit signed distance field values of the points, where vectors of other dimensions serve as the implicit apparent eigenvectors containing surface information.

In an embodiment, the calculating normal directions and volume densities of the spatial points according to the implicit signed distance field values of the points so as to obtain geometric information of a human body includes:

calculating the volume densities of the spatial points according to the implicit signed distance field values of the points by using the following formula:

$$\sigma(x') = \begin{cases} \alpha\left(1 - \frac{1}{2}\exp\left(\frac{s(x')}{\beta}\right)\right) & \text{if } s(x') < 0 \\ \frac{1}{2}\alpha\exp\left(-\frac{s(x')}{\beta}\right) & \text{if } s(x') \geq 0 \end{cases}$$

where $s(x')$ represents the implicit signed distance field values of the spatial points $x'$ in the standard T-Pose space, $\sigma(x')$ represents the volume densities of the spatial points $x'$, and $\alpha>0$ and $\beta>0$ both represent parameters that need to be learned.

In an embodiment, the calculating material information of the human body according to the implicit apparent eigenvectors by using a BRDF representation module includes:

dividing the spatial points in the standard T-Pose space into two parts of head spatial points and body spatial points, inputting the implicit apparent eigenvectors corresponding to the head spatial points to a high-dimensional encoder for predicting material information corresponding to the head points, inputting the implicit apparent eigenvectors corresponding to the body spatial points to a low-dimensional encoder for predicting material information corresponding to the body points, and fusing the material information corresponding to the head spatial points and the material information corresponding to the body spatial points into the material information of the spatial points.

In an embodiment, both the high-dimensional encoder and the low-dimensional decoder adopt an encoding-decoding structure, the input apparent eigenvectors and the spatial points are encoded into latent code vectors by using an encoding portion, and the latent code vectors are decoded into the material information by using a decoding portion.

In an embodiment, the converting the material information of the spatial points into material information of curved surface points of the human body includes:

performing volumetric integration on the material information of the spatial points to obtain the material information of the curved surface points of the human body.

In an embodiment, the introducing visible probes to record visibility information of each pose from a surface of the human body to a surrounding light source includes:

storing the visible probes on grid nodes of an SMPL template; representing a corresponding one of the visible probes stored on each of the grid nodes as a Gaussian sum of a plurality of spherical surfaces; in each of the video frames, emitting light from each of the visible probes to all directions of the space, and performing integration on a density and a volume on a light path to calculate the visibility information; and fitting a spherical Gaussian parameter in the visible probe by using the visibility information, such that the visibility information of each motion frame is capable of being stored in the visible probe.

In an embodiment, the representing ambient lighting information by a volumetric lighting grid including spherical Gaussian models includes:

representing lighting as the volumetric lighting grid, with each grid node containing a spherical Gaussian mixture representation, such that a spatial point is given and local lighting of the spatial point is approximated using trilinear interpolation in the volumetric lighting grid.

In an embodiment, in the process of building the implicit human body model, all parameters used need to be optimized before being applied; and a specific parameter optimization process includes:

building a training system comprising the neural skin module, the neural signed distance field module, the BRDF representation module, a neural color module, a volume renderer, and a physical renderer, where the neural color module calculates color values of the spatial points according to the spatial points of the standard T-Pose space, the normal directions of the spatial points, an observation direction, the implicit apparent eigenvectors, and a second hidden variable that needs to be learned and optimized, the volume renderer draws a reconstructed image according to the color values and the volume densities of the spatial points, and the physical renderer draws a rendered image according to the implicit human body model; and training the training system based on an input video frame to optimize the parameters: firstly, performing first-stage training on the neural skin module, the neural signed distance field module, and the neural color module by using a difference value between the reconstructed image and the input video frame as a rebuilding loss; then, fixing the parameters in the first-stage training, and performing second-stage training on the BRDF representation module, the visible probe, and parameters of the spherical Gaussian models by using a difference value between the rendered image and the input video frame as a redrawing loss.

In an embodiment, the process that the physical renderer draws a rendered image according to the implicit human body model includes:

performing unbiased estimation on a rendering equation through Monte Carlo importance sampling, sampling, on this basis, a BRDF with a visible normal distribution function, and obtaining a highlight term in a rendering result through statistical calculation, which is expressed by the following formula:

$$\hat{L}_o(x_s, \omega_o) = \frac{1}{K}\sum_{k=1}^{K} \frac{L_k(x_s, \omega_k)F(x_s, h, \omega_k)G_2(x_s, \omega_k, \omega_o)}{G_1(x_s, \omega_o)}$$

where $\hat{L}_o(x_s, \omega_o)$ represents the highlight term of a surface point $x_s$ in a direction $\omega_o$ of emergent light, $L_i(x_s, \omega_k)$ represents lighting information of the surface point $x_s$ in a direction $\omega_k$ of incident light that is calculated by multiplying the visibility information by the ambient lighting information, $F(x_s, h, \omega_k)$ represents a Fresnel term, $G_1(x_s, \omega_o)$ represents a Smith masking function calculated according to a normal direction $n(x_s)$ of the surface point contained in the geometric information, the roughness $g(x_s)$ at the surface point $x_s$ contained in the material information, and an emergent direction, $G_2(x_s, \omega_k, \omega_o)$ represents a Smith joint masking-shadowing function calculated according to a normal of the surface point contained in the geometric information, the roughness $g(x_s)$ at the surface point $x_s$ contained in the material information, the emergent direction, and an incident direction, k represents a sampling direction, and K represents the number of rays sampled; and after the highlight term of the emergent light at the surface point $x_s$ is obtained, obtaining the rendering result of the surface point $x_s$ in combination with a diffuse reflection component $$\frac{a(x_s)}{\pi}$$

obtained from a diffuse reflectance $a(x_s)$ at the surface point $x_s$.

To achieve the above object of the invention, an embodiment further provides an apparatus for rebuilding a relightable implicit human body model, including a spatial point mapping unit, a neural signed distance unit, a geometric information building unit, a material information building unit, a visibility information building unit, an ambient lighting information building unit, and a combination unit, where the spatial point mapping unit is configured to obtain spatial points in a pose space based on sparse video frames, and to map the points in the pose space back to a standard T-Pose space by using a neural skin module;

the neural signed distance unit is configured to calculate implicit signed distance field values and implicit apparent eigenvectors of the points according to spatial points in the standard T-Pose space by using a neural signed distance field module;

the geometric information building unit is configured to calculate normal directions and volume densities of the spatial points according to the implicit signed distance field values of the points so as to obtain geometric information of a human body;

the material information building unit is configured to calculate material information of the spatial points according to the implicit apparent eigenvectors by using a BRDF representation module, and to convert the material information of the spatial points into material information of curved surface points of the human body;

the visibility information building unit is configured to introduce visible probes to record visibility information of each pose from a surface of the human body to a surrounding light source;

the ambient lighting information building unit is configured to represent ambient lighting information by a volumetric lighting grid including spherical Gaussian models; and the combination unit is configured to form an implicit human body model by the geometric information of the human body, the material information of the curved surface points of the human body, the visibility information, and the ambient lighting information.

To achieve the above object of the invention, an embodiment further provides a computing device, including a memory, a processor, and a computer program stored in the memory and executable on the processor, where the processor, when executing the computer program, implements the above method for rebuilding a relightable implicit human body model.

To achieve the above object of the invention, an embodiment further provides a computer-readable storage medium, having a computer program stored thereon, where the computer program, when executed, implements the above method for rebuilding a relightable implicit human body model.

Compared with the prior art, the present invention has at least the following beneficial effects:

The human body is represented as a deformable implicit neural representation, and a geometric shape, material attributes, and ambient lighting of the human body are decomposed to obtain a relightable and drivable implicit human body model. In addition, the volumetric lighting grid including the plurality of spherical Gaussian models is introduced to represent complex lighting with spatial variation, and the visible probes capable of changing in position with change in human pose are introduced to record dynamic self-occlusion caused by human motion. With the method, drivable implicit models capable of being used for high-fidelity human body relighting may be generated in cases of sparse video input and even monocular input.

BRIEF DESCRIPTION OF THE DRAWINGS

To more clearly illustrate the technical solutions in the embodiments of the present invention or in the prior art, the accompanying drawings that need to be used in the description of the embodiments or the prior art will be briefly described below. Apparently, the accompanying drawings in the description below merely illustrate some embodiments of the present invention. Those of ordinary skill in the art may also derive other accompanying drawings from these accompanying drawings without creative efforts.

DETAILED DESCRIPTION OF THE EMBODIMENTS

To make the objects, the technical solutions and advantages of the present invention clearer, the present invention is further described in detail below in conjunction with the accompanying drawings and the embodiments. It should be understood that the specific embodiments described herein are merely used to explain the present invention, but not to limit the scope of protection of the present invention.

In order to build a relightable and drivable implicit human body model, an embodiment provides a method and an apparatus for rebuilding a relightable implicit human body model. The implicit human body model built using sparse video frames as an input has high quality and low cost.

Figure 1:
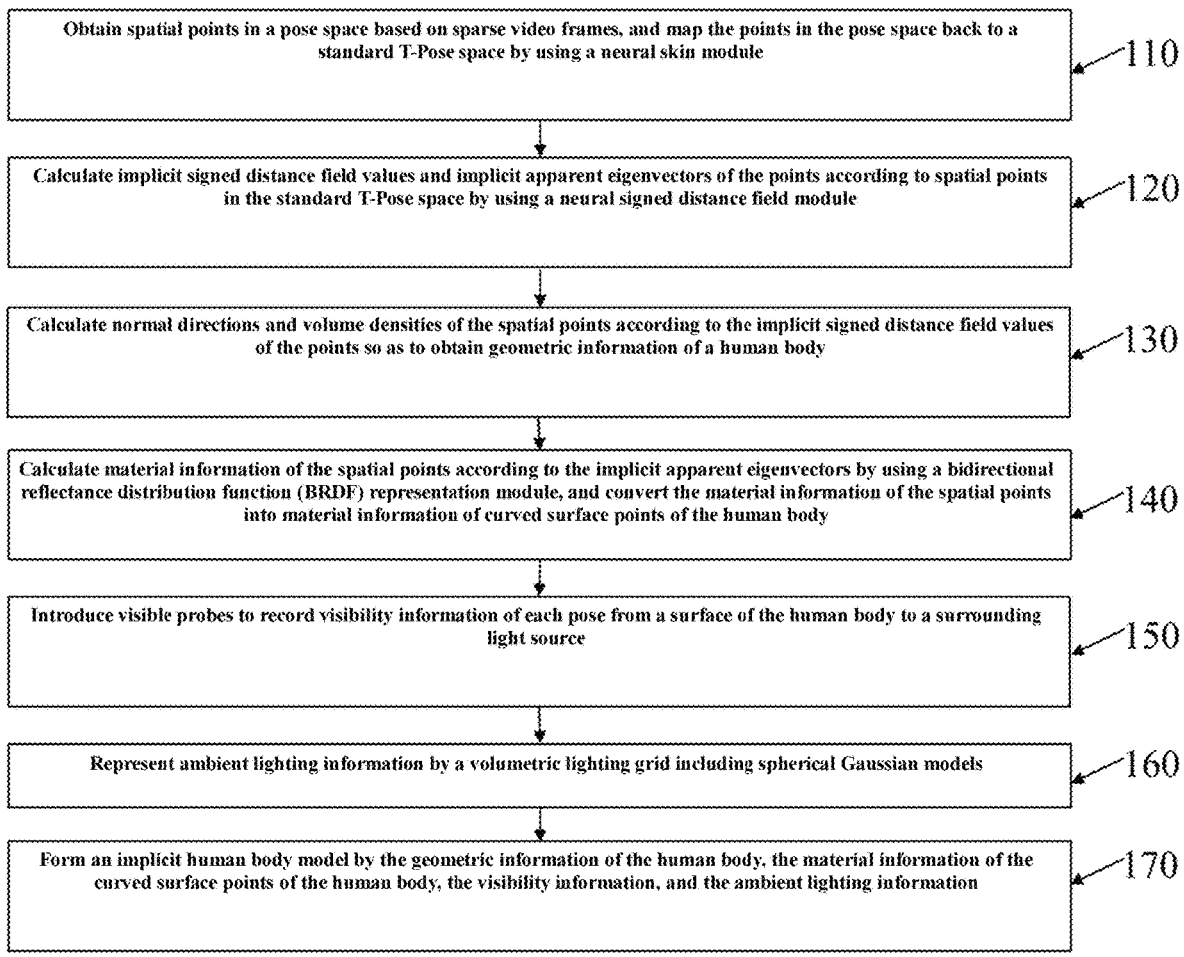
FIG. 1 is a flowchart of a method for rebuilding a relightable implicit human body model provided by an embodiment.

As shown in FIG. 1, a method for rebuilding a relightable implicit human body model provided by an embodiment includes the following steps.

In S110, spatial points in a pose space are obtained based on sparse video frames, and the points in the pose space are mapped back to a standard T-Pose space by using a neural skin module.

In this embodiment, the video frames are captured from a sparse video, camera position information is obtained from the video frames, a plurality of rays are projected into the pose space based on the camera position information, and the spatial points in the pose space are sampled from the rays. The T-pose space refers to a space where a T-pose is located, and the T-pose is used to bind a preset pose of a three-dimensional skeleton model.

In this embodiment, SMPL (Skinned Multi-Person Linear) is used as a template to guide physical deformation of a surface of a human body, abbreviated as an SMPL template. Based on this, the process that the points in the pose space are mapped back to a standard T-Pose space by using a neural skin module includes:

firstly, obtaining basic skin weights $\hat{w}_i^j(x)$ of the spatial points x in the pose space by using the SMPL template, specifically, obtaining skin weights of curved surface points on an SMPL surface closest to the current spatial points x through barycentric interpolation, and calculating residual skin weights $\Delta w$ according to the spatial points x and a first hidden variable $\psi_i$ that needs to be learned and optimized by using a first neural network as a neural skin field, specifically represented by $f_{\alpha w}:(x, \psi_i) \mapsto \Delta w$, where the residual skin weights $\Delta w$ provide constraints on non rigid body transformation caused by skeleton motion, and the first hidden variable $\psi_i$ needs to be optimized during training;

then, calculating a final skin weight $w_i^j(x)$ for each video frame according to the basic skin weights and the residual skin weights, where the final skin weight is used to determine a rebuilt human body model, and $w_i^j(x)$ is expressed by the following formula:

$$\overline{w}_i^j(x) = \Delta w + \hat{w}_i^j(x)$$
$$w_i^j(x) = \overline{w}_i^j(x) / \sum_j \overline{w}_i^j(x)$$

finally, mapping the spatial points in the pose space back to the standard T-Pose space by using the final skin weight and a transformation matrix, to obtain spatial points x' in the standard T-Pose space, expressed by the following formula:

$$x' = T_i(x) = \sum_j w_i^j(x)\left(R_i^j x + t_i^j\right)$$

where $R_i^j$ and $t_i^j$ represent a rotation transformation matrix and a translation transformation matrix required to convert joint points j estimated according to the SMPL template in an $i^{th}$ video frame from the pose space back to the standard T-Pose space, respectively, j represents J joint points of the human body corresponding to a video frame, and $T_i(x)$ represents a dynamic field for mapping the spatial points in the pose space back to the spatial points in the standard T-Pose space.

Figure 4:
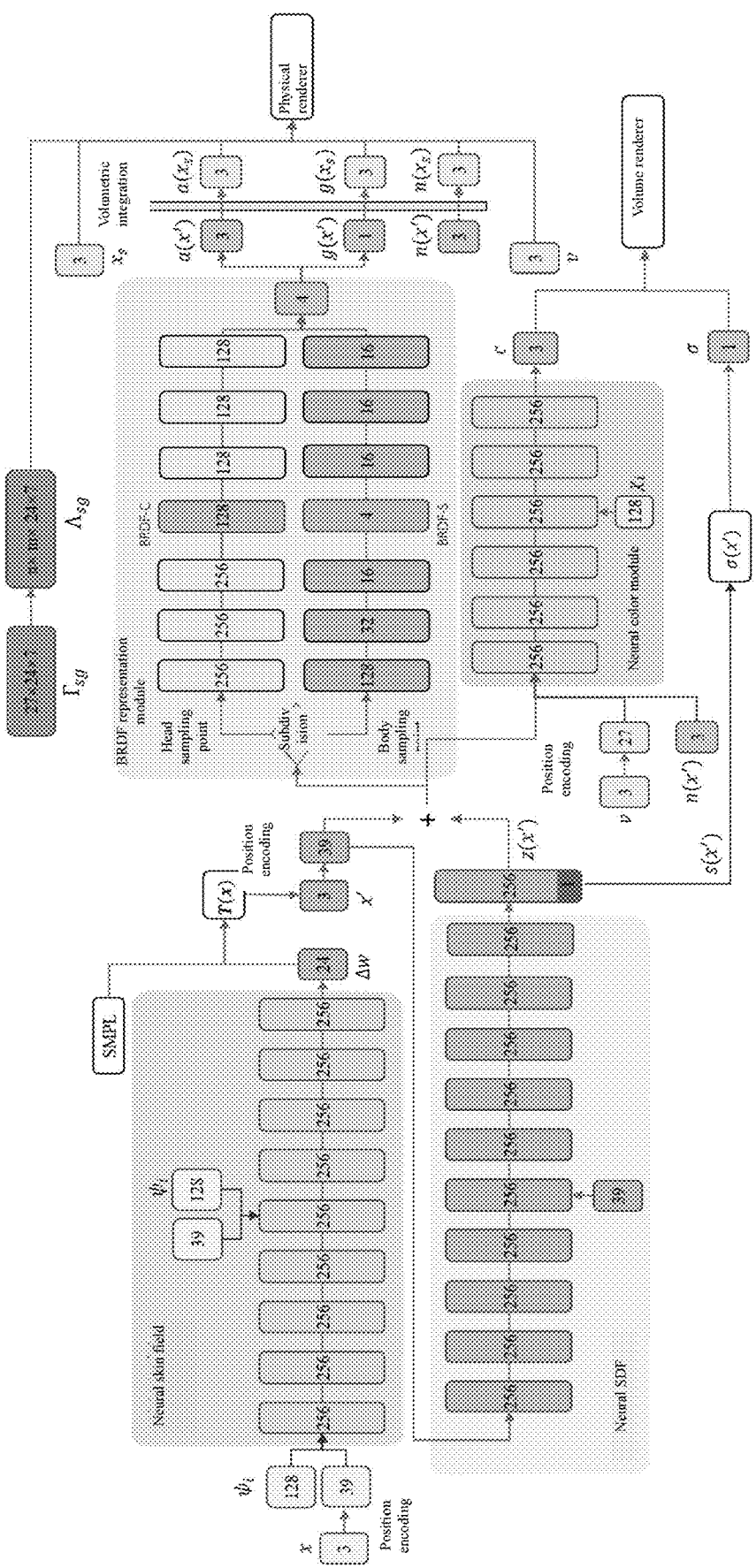
FIG. 4 is a schematic structural diagram of a neural network provided by an embodiment.

In this embodiment, the first neural network $f_{\Delta w}$ is a fully connected network, with a structure as shown in FIG. 4, where numbers such as 256 and 128 represent dimensions.

In S120, implicit signed distance field values and implicit apparent eigenvectors of the points are calculated according to spatial points in the standard T-Pose space by using a neural signed distance field module.

In this embodiment, the neural signed distance field (SDF) module (the SDF module for short) uses a second neural network $f_s$ as a neural SDF to determine the human body model in the standard T-Pose space, any spatial point is input, an SDF value of the spatial point away from a surface of an object is estimated, the human body model is represented as an implicit zero surface, and a normal and a volume density of each spatial point can be extracted from the SDF value. A working process of the neural SDF $f_s$ is represented as follows: $f_s: (x') \mapsto (s(x'), z(x'))$. During specific implementation, output hidden vectors are calculated according to the spatial points x' in the standard T-Pose space by using a second neural network $f_s$, and one-dimensional vectors are extracted from the hidden vectors to serve as the neural SDF values s(x') of the points, where the s(x') contain geometric information of the spatial points x', such that geometric information of the human body can be calculated with the s(x'), and vectors of other dimensions serve as the implicit apparent eigenvectors z(x') containing surface information.

In this embodiment, the second neural network $f_s$ may be a fully connected neural network, with a structure as shown in FIG. 4, where in the output hidden vectors, 256 dimensions refer to z(x'), and 1 dimension refers to s(x').

In S130, normal directions and volume densities of the spatial points are calculated according to the implicit signed distance field values of the points so as to obtain geometric information of a human body.

In this embodiment, the volume densities σ(x') of the spatial points x' are calculated according to the SDF values s(x') by using the following formula:

$$\sigma(x') = \begin{cases} \alpha\left(1 - \frac{1}{2}\exp\left(\frac{s(x')}{\beta}\right)\right) & \text{if } s(x') < 0 \\ \frac{1}{2}\alpha\exp\left(-\frac{s(x')}{\beta}\right) & \text{if } s(x') \geq 0 \end{cases}$$

where α>0 and β>0 both represent parameters that need to be learned, and the parameters α and β need to be optimized during training.

In this embodiment, the normal directions n(x') of the spatial points x' can be obtained by calculating gradients of the spatial points x' according to position information of the spatial points x', and the normal directions n(x') and the volume densities σ(x') of the spatial points jointly form the geometric information of the human body.

In step 4, material information of the spatial points is calculated according to the implicit apparent eigenvectors by using a bidirectional reflectance distribution function (BRDF) representation module, and the material information of the spatial points is converted into material information of curved surface points of the human body.

For the estimation of a BRDF, some existing methods are to introduce a prior database of a real BRDF into prediction networks. The universality of these prediction networks depends on training data to a great extent. Some other methods are to directly predict reflection parameters with fully connected networks, thereby being applicable to static objects. For a moving character, the roughness and albedo of a surface material are entangled with geometric deformation, such that it is a more challenging task to decompose the surface material of a moving human body.

The BRDF representation module $f_r'$ adopts an encoder with an encoding-decoding structure. Firstly, the apparent eigenvectors z(x') generated by f and the spatial points x' are encoded into latent code vectors $z_{BRDF}(x')$ by using an encoding portion, and then the latent code vectors $z_{BRDF}(x')$ are decoded into the material information by using a decoding portion. Because z(x') contains BRDF information, a material coefficient can be obtained through encoding and decoding. The material coefficient is analyzed to obtain a three-dimensional diffuse reflectance a(x') and one-dimensional roughness g(x') of the BRDF, specifically represented by $f_r'$: (x', z(x')) ↦ (a(x'), g(x')), where a(x') and g(x') are collectively referred to as the material information.

In this embodiment, a way of dividing the human body into a head and a body is further provided, and the spatial points x' are divided into two groups according to whether they belong to the head or the body. To fit with two sets of data, as shown in FIG. 4, the encoder is correspondingly divided into two branches, where the first branch is a high-dimensional encoder BRDF-C with an encoding-decoding structure, and the second branch is a low-dimensional encoder BRDF-S with an encoding-decoding structure. Based on this, the first group contains the spatial points sampled from the head, and the implicit apparent eigenvectors corresponding to the head spatial points are input to the high-dimensional encoder BRDF-C for predicting high-resolution material information corresponding to the head points; the second group contains the spatial points sampled from the body, and the implicit apparent eigenvectors corresponding to the body spatial points are input to the low-dimensional encoder BRDF-S for predicting smooth material information corresponding to the body points; and the material information corresponding to the head spatial points and the material information corresponding to the body spatial points are fused into the material information of the spatial points by a fully connected layer.

In this embodiment, the high-dimensional encoder BRDF-C and the low-dimensional encoder BRDF-S have the same structure, both the encoding portion and the decoding portion adopt the fully connected layer, and there is a difference that the dimension of the fully connected layer of the high-dimensional encoder BRDF-C is higher than the dimension of the fully connected layer of the low-dimensional encoder BRDF-S.

In this embodiment, the material information of the spatial points is obtained by the BRDF representation module. During the building of the implicit human body model, the material information of the curved surface points of the human body is required. As a result, the material information of the spatial points needs to be converted into the material information of the curved surface points of the human body. Specifically, the material information of the curved surface points $x_s$ of the human body along space rays r(t) is obtained through volumetric integration of the material information of the spatial points, including the three-dimensional diffuse reflectance $a(x_s)$ and the roughness $g(x_s)$.

A way of obtaining the curved surface points $x_s$ of the human body is as follows: intersection points of the space rays r(t)=o+td starting from a camera o along a direction d and a surface geometry of the character are the curved surface points $x_s$ of the human body, calculated by the following formula:

$$x_s = o + \sum_{n=1}^{N}\left(\prod_{m=1}^{n-1}(1 - \alpha_m)\alpha_n t_n\right)d$$

where $t_n$ represents a depth at which the surface intersection points start from the camera, d represents a direction of rays, $\alpha_n$ represents the opacity from the camera o to an $n^{th}$ sampling point, and $\alpha_m$ represents the opacity from the camera o to an $m^{th}$ sampling point sampling point.

In S150, visible probes are introduced to record visibility information of each pose from a surface of the human body to a surrounding light source.

Lighting for the curved surface points on the surface of the human body is related to occlusion, and different body parts have different mutual occlusion relationships in different frames, so dynamic and accurate visibility is particularly crucial for decomposing the moving human body. Some existing methods are to calculate the visibility of each light direction starting from any point by emitting rays to penetrate through a density body, to estimate the attenuation of incident light along the direction. However, values of sampling and integration points in such methods require time overhead, and as the number of times of calculation required increases, the time overhead becomes unbearable. To accelerate a visibility query, some other existing methods are to predict the visibility with fully connected networks. However, such methods have low accuracy and are only applicable to static objects, not to moving human bodies that require complex non rigid motion.

Figure 3:
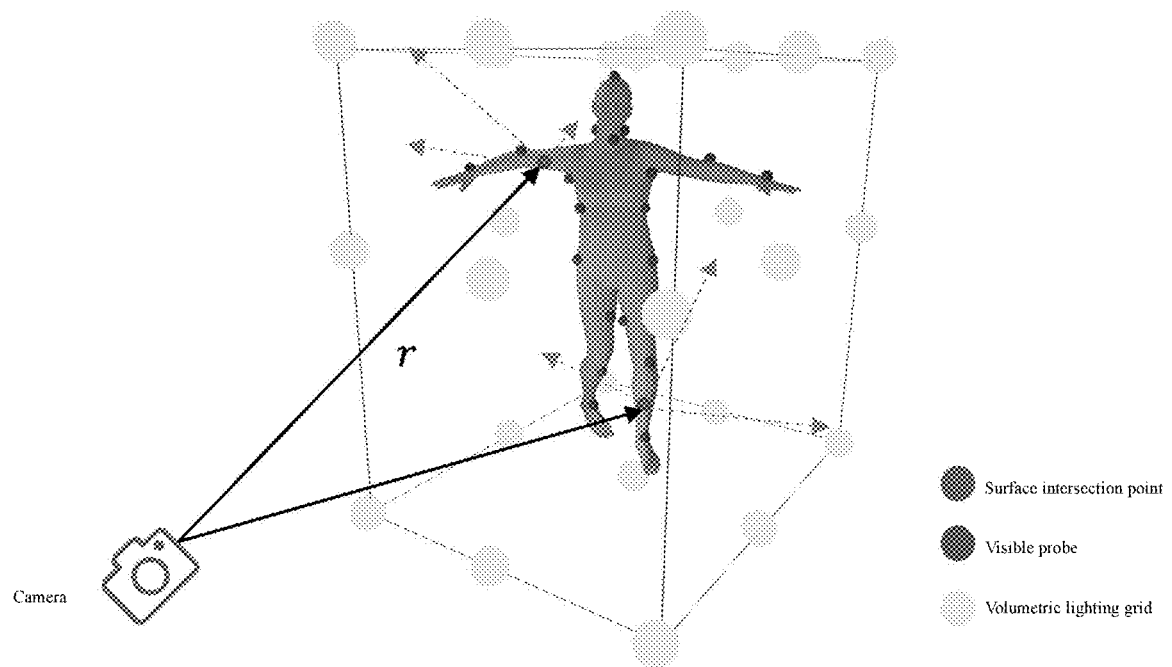
FIG. 3 is a schematic diagram of a volumetric lighting grid and visible probes provided by an embodiment.

In this embodiment, it is proposed that the visibility query is represented and accelerated with the visible probes with optimizable parameters that move with poses of the human body. It has been proposed in the neural skin module that physical geometry deformation of the surface of the human body is guided using the SMPL template according to pose parameters of the character, where the SMPL template contains 6,890 deformable grid nodes. Based on the characteristics of the grid nodes of the SMPL template, as shown in FIG. 3, the visible probes are stored on the grid nodes of the SMPL template. The visible probe stored on each grid node is represented as a Gaussian sum of a plurality of (such as 24) spherical surfaces. In this way, the visible probes can move in the space with human actions. In each video frame, light is emitted from each visible probe to all directions of the space, and integration is performed on a density and a volume on a light path to calculate the visibility information;

and a spherical Gaussian parameter in the visible probe is fitted by using the visibility information, such that the visibility information of each motion frame is capable of being stored in the visible probe. In practice, experiments have shown that a faster query and a more effective visibility representation are provided using fewer trained parameters, which speeds up training and rendering.

In S160, ambient lighting information is represented by a volumetric lighting grid including spherical Gaussian models.

Various optimizable lighting representation methods have been used in existing micro rendering pipelines. Some methods focus on the reconstruction of small static objects. Lighting is represented with a mixed spherical Gaussian (SG) model or a separated environmental image. These representations assume that light comes from a place at infinity, which violates actual physics and may lead to errors in human body rebuilding. For example, when an image is shot in a room that is not large enough for a person, a close-range light source should be considered as local light, and the intensities received by different parts of the body may vary significantly.

In this embodiment, as shown in FIG. 3, lighting is represented as a 3×3×3 volumetric lighting grid, with each grid node containing a spherical Gaussian mixture representation, such that a spatial point is given and local lighting of the spatial point is approximated using trilinear interpolation in the volumetric lighting grid. As a result, during training, the representation of lighting with spatial variation and the BRDF can be subjected to joint optimization.

In S170, an implicit human body model is formed by the geometric information of the human body, the material information of the curved surface points of the human body, the visibility information, and the ambient lighting information.

In this embodiment, after being obtained through the above steps 1-6, the geometric information of the human body, the material information of the curved surface points of the human body, the visibility information, and the ambient lighting information form the implicit human body model. In the implicit human body model, driving of the geometric information of the human body is implemented based on the skin weights, relighting is implemented through the visibility information and the ambient lighting information, and change of lighting parameters received by the human body during operation is supported.

In this embodiment, all parameters involved and used in the steps 1-6 need to be optimized before being applied. A specific parameter optimization process includes the following steps.

Figure 2:
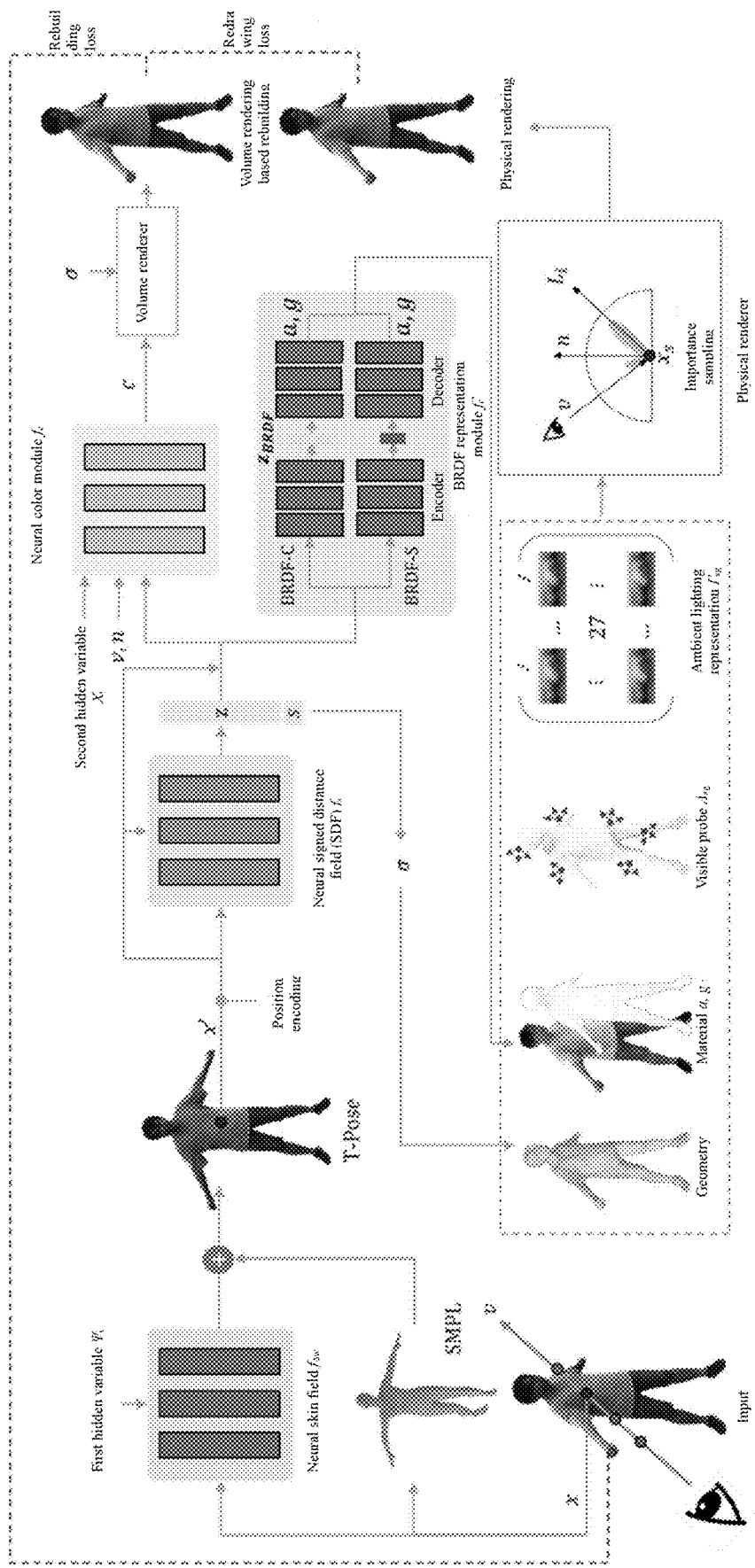
FIG. 2 is a schematic structural diagram of a training system provided by an embodiment.

(a) A training system as shown in FIG. 2 is built, where the training system includes the neural skin module, the neural SDF module, the BRDF representation module, a neural color module, a volume renderer, and a physical renderer.

In this embodiment, the neural color module $f_c$ calculates color values $c_i(x)$ of the spatial points according to the spatial points x' of the standard T-Pose space, the normal directions n(x') of the spatial points, an observation direction v(x'), the implicit apparent eigenvectors z(x'), and a second hidden variable $\chi_i$ that needs to be learned and optimized. In this way, geometric information of the character can be optimized with colors of input video frames. During the process, the BRDF information is implicitly learned by z(x'), such that displayed BRDF parameters can be derived from z(x') by using the displayed differentiable volume renderer subsequently. Because the changing pose of the person will lead to different occlusion states of the human body, in order to obtain a continuous human body representation, the second hidden variable $\chi_i$ is introduced to encode appearance change information caused by different poses, such that the color values of the spatial points can be predicted by the following formula:

$$f_c:(x',n(x'),z(x'),v(x');\chi_i) \mapsto c_i(x)$$

In this embodiment, the neural color module $f_c$ may adopt a fully connected network, and a specific structure thereof is as shown in FIG. 4.

In this embodiment, the volume renderer draws a reconstructed image according to the color values $c_i(x)$ and the volume densities $\sigma_i(x)$ of the spatial points. A specific process is as follows: for each pixel, N spatial points are sampled along the incident light by using a sampling algorithm proposed by Yariv. Such a sampling method is capable of limiting an error to an error upper boundary, thus reducing noise. As a result, values of pixels along the incident light r can be calculated by the following formula:

$$C(r) = \sum_{n=1}^{N}\left(\prod_{m=1}^{n-1}(1-\alpha_m)\alpha_n c_n\right),$$

$$\alpha_n = 1 - \exp(-\sigma_n \delta_n),$$

wherein $\delta_n = t_{n+1} - t_n$ is a spacing between two sampling points n and n+1, $c_n$ and $\sigma_n$ are colors and volume densities of the sampling points, obtained from the color values $c_i(x)$ and the volume densities $\sigma_i(x)$, and m refers to indexes of the sampling points.

In this embodiment, in order to relight the rebuilt implicit human body model in a new lighting environment, it is crucial to decompose the material information, the ambient lighting information, the visibility information, and the effective representation of the BRDF in the image for differentiable inverse rendering. As a result, the physical renderer is introduced to draw a rendered image according to the implicit human body model, and the parameters are optimized according to the rendered image. In the physical renderer, a Cook-Torrance shading model capable of processing complex appearance surfaces is integrated, rather than a simple Phong BRDF.

In existing methods, high-quality rendered images can be obtained through Monte Carlo integration, but in order to reduce noise, a large amount of sampling is required, which is very time-consuming. Thus, in the physical renderer, unbiased estimation is performed on a rendering equation through Monte Carlo importance sampling, which improves the robustness (accuracy) and efficiency of complex rendering integration. On this basis, the BRDF is sampled with a visible normal distribution function, which improves the rendering quality. The physical renderer is differentiable throughout the entire process and can be configured to perform training in combination with the neural networks to obtain a highlight term in a rendering result. The highlight term is obtained based on statistical calculation and expressed by the following formula:

$$\hat{L}_o(x_s,\omega_o) = \frac{1}{K}\sum_{k=1}^{K}\frac{L_k(x_s,\omega_k)F(x_s,h,\omega_k)G_2(x_s,\omega_k,\omega_o)}{G_1(x_s,\omega_o)}$$

where $\hat{L}_o(x_s, \omega_o)$ represents the highlight term of a surface point $x_s$ in a direction $\omega_o$ of emergent light, $L_i(x_s, \omega_k)$ represents lighting information of the surface point $x_s$ in a direction $\omega_k$ of incident light that is calculated by multiplying the visibility information by the ambient lighting information, $F(x_s, h, \omega_k)$ represents a Fresnel term, $G_1(x_s, \omega_o)$ represents a Smith masking function calculated according to a normal direction $n(x_s)$ of the surface point, the roughness $g(x_s)$ at the surface point $x_s$, and an emergent direction, $G_2(x_s, \omega_k, \omega_o)$ represents a Smith joint masking-shadowing function calculated according to a normal of the surface point, the roughness $g(x_s)$ at the surface point $x_s$, the emergent direction, and an incident direction, k represents a sampling direction, and K represents the number of rays sampled based on the visible normal distribution function $D_V$. Specific sampled PDF is as follows:

$$PDF(\omega_i) = \frac{D_V(\omega_o, n(x_s))}{4(\omega_o \cdot n(x_s))}$$

After the highlight term of the emergent light at the surface point $x_s$ is obtained, the rendering result of the surface point $x_s$ can be obtained in combination with a diffuse reflection component $$\frac{a(x_s)}{\pi}$$

obtained from a diffuse reflectance $a(x_s)$ at the surface point $x_s$.

It should be noted that the above physical renderer is not only used during scenario decomposition. When material decoupling is completed to obtain various scenario components, the physical renderer will also be used to draw images under new viewpoints, lighting, and material coefficients.

(b) The training system is trained based on an input video frame to optimize the parameters. The whole training includes first-stage training and second-stage training. During the first-stage training, basic geometric information and color appearance information of the character are learned with the volume renderer, where a final skin weight of the surface of the human body is implicitly represented by a neural skin weight field embodied by the first neural network, the field can be combined with the SMPL parameters to jointly drive the human body model, geometric information is represented by an implicit neural SDF embodied by the second neural network, and the normal and the volume density of each spatial point can be extracted therefrom. The colors of the spatial points are provided by a neural color field embodied by a third neural network, the reconstructed image is drawn with the volume renderer, and the reconstructed image is matched with the input video frame for training.

Specifically, during the first-stage training, the first-stage training is performed on the neural skin module, the neural SDF module, and the neural color module by using a difference value between the reconstructed image and the input video frame as a rebuilding loss, where trained parameters include a parameter of the first neural network $f_{\Delta w}$, the first hidden variable $\psi_i$, a parameter of the second neural network $f_s$, the parameters $\alpha$ and $\beta$ used in calculation of the volume densities $\sigma(x')$, a parameter of the third neural network $f_c$ and the second hidden variable $\chi_i$; and during the second-stage training that is on the basis of the first-stage training, the parameters in the first-stage training are fixed, and the relightable implicit human body model is built by building the material information, the visibility information, and the ambient lighting information, where the material information is represented by using a BRDF field and includes the reflectance and the roughness of the implicit human body model on each curved surface point. The visibility information of each spatial pose from the surface of the human body to the surrounding light source is recorded with the movable visible probes. The ambient lighting information of a surrounding environment is represented by the volumetric lighting grid including the spherical Gaussian models. In combination with the geometric information learned in the first stage, rendering is performed by using the physical renderer to obtain the rendered image, and the rendered image is matched with the input video frame for training.

Specifically, during the second-stage training, the second-stage training is performed on the BRDF representation module, the visible probes, and parameters of the spherical Gaussian models by using a difference value between the rendered image and the input video frame as a redrawing loss, where trained parameters include a parameter of the encoder, spherical Gaussian parameters of the visible probes $\Lambda_{sg}$, and the parameters of the spherical Gaussian models in the ambient lighting information $\Gamma_{sg}$.

After being trained, all the parameters in the training system can be used for rebuilding the implicit human body model.

Figure 5:
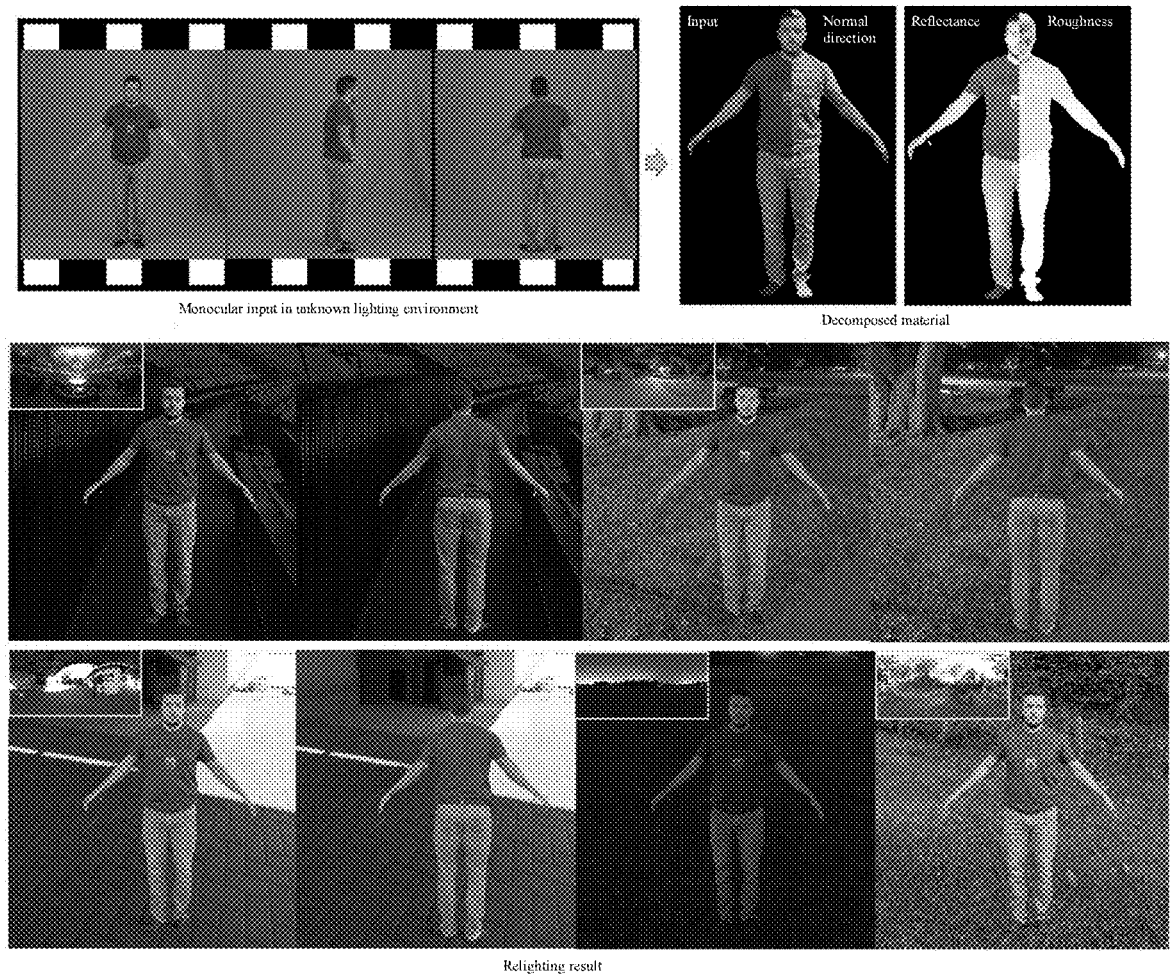
FIG. 5 is a schematic diagram of a generated result provided by an embodiment.

With the method for rebuilding the relightable implicit human body model provided by the above embodiment, a three-dimensional (3D) human body representation can be generated using an input video collected from unknown lighting, and rendering in brand new viewpoints, poses, and scenarios is supported. FIG. 5 shows an implicit character model rebuilt from a monocular video, including geometric information, material information, and a multi-view redrawing result of a character in a brand-new scenario.

Figure 6:
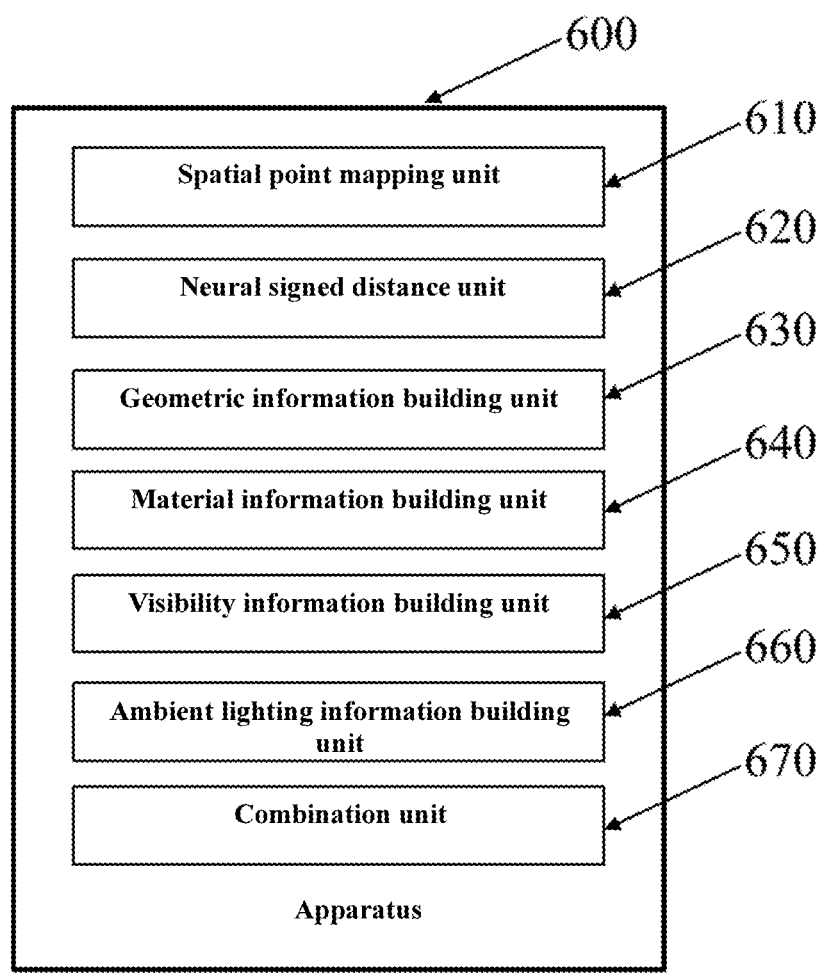
FIG. 6 is a flowchart of an apparatus for rebuilding a relightable implicit human body model provided by an embodiment.

Based on the same inventive concept, as shown in FIG. 6, an embodiment further provides an apparatus 600 for rebuilding a relightable implicit human body model, including a spatial point mapping unit 610, a neural signed distance unit 620, a geometric information building unit 630, a material information building unit 640, a visibility information building unit 650, an ambient lighting information building unit 660, and a combination unit 670.

The spatial point mapping unit 610 is configured to obtain spatial points in a pose space based on sparse video frames, and to map the points in the pose space back to a standard T-Pose space by using a neural skin module.

The neural signed distance unit 620 is configured to calculate implicit signed distance field values and implicit apparent eigenvectors of the points according to spatial points in the standard T-Pose space by using a neural signed distance field module.

The geometric information building unit 630 is configured to calculate normal directions and volume densities of the spatial points according to the implicit signed distance field values of the points so as to obtain geometric information of a human body.

The material information building unit 640 is configured to calculate material information of the spatial points according to the implicit apparent eigenvectors by using a BRDF representation module, and to convert the material information of the spatial points into material information of curved surface points of the human body.

The visibility information building unit 650 is configured to introduce visible probes to record visibility information of each pose from a surface of the human body to a surrounding light source.

The ambient lighting information building unit 660 is configured to represent ambient lighting information by a volumetric lighting grid including spherical Gaussian models.

The combination unit 670 is configured to form an implicit human body model by the geometric information of the human body, the material information of the curved surface points of the human body, the visibility information, and the ambient lighting information.

It should be noted that during building of the implicit human body model, the apparatus for rebuilding a relightable implicit human body model provided by the above embodiment should use the division of the above functional units as an example for description, and the above functions can be implemented with different functional units according to requirements, that is, an internal structure of a terminal or a server can be divided into different functional units to implement all or some of the functions described above. In addition, the apparatus for rebuilding a relightable implicit human body model provided by the above embodiment belongs to the same concept as the embodiment of the method for rebuilding a relightable implicit human body model, and a specific implementation process thereof is detailed in the embodiment of the method for rebuilding a relightable implicit human body model and thus will not be repeated herein.

Based on the same inventive concept, an embodiment further provides a computing device, including a memory, a processor, and a computer program stored in the memory and executable on the processor, where the processor, when executing the computer program, implements the above method for rebuilding a relightable implicit human body model, including the following steps:

S110: obtaining spatial points in a pose space based on sparse video frames, and mapping the points in the pose space back to a standard T-Pose space by using a neural skin module;

S120: calculating implicit signed distance field values and implicit apparent eigenvectors of the points according to spatial points in the standard T-Pose space by using a neural signed distance field module;

S130: calculating normal directions and volume densities of the spatial points according to the implicit signed distance field values of the points so as to obtain geometric information of a human body;

S140: calculating material information of the spatial points according to the implicit apparent eigenvectors by using a BRDF representation module, and converting the material information of the spatial points into material information of curved surface points of the human body;

S150: introducing visible probes to record visibility information of each pose from a surface of the human body to a surrounding light source;

S160: representing ambient lighting information by a volumetric lighting grid including spherical Gaussian models; and S170: forming an implicit human body model by the geometric information of the human body, the material information of the curved surface points of the human body, the visibility information, and the ambient lighting information.

The memory may be a near volatile memory such as a random access memory (RAM), a non-volatile memory such as a read-only memory (ROM), a FLASH, a floppy disk, and a mechanical hard disk, or a remote storage cloud. The processor may be a central processing unit (CPU), a microprocessor unit (MPU), a digital signal processor (DSP), or a field programmable gate array (FPGA), that is, the steps of the above method for rebuilding a relightable implicit human body model can be implemented with these processors.

Based on the same inventive concept, an embodiment further provides a computer-readable storage medium, having a computer program stored thereon, where the computer program, when executed, implements the above method for rebuilding a relightable implicit human body model, including the following steps:

S110: obtaining spatial points in a pose space based on sparse video frames, and mapping the points in the pose space back to a standard T-Pose space by using a neural skin module;

S120: calculating implicit signed distance field values and implicit apparent eigenvectors of the points according to spatial points in the standard T-Pose space by using a neural signed distance field module;

S130: calculating normal directions and volume densities of the spatial points according to the implicit signed distance field values of the points so as to obtain geometric information of a human body;

S140: calculating material information of the spatial points according to the implicit apparent eigenvectors by using a BRDF representation module, and converting the material information of the spatial points into material information of curved surface points of the human body;

S150: introducing visible probes to record visibility information of each pose from a surface of the human body to a surrounding light source;

S160: representing ambient lighting information by a volumetric lighting grid including spherical Gaussian models; and S170: forming an implicit human body model by the geometric information of the human body, the material information of the curved surface points of the human body, the visibility information, and the ambient lighting information.

The computer-readable storage medium may be an ROM, an RAM, a compact disc read-only memory (CD-ROM), a magnetic tape, a floppy disk, an optical data storage device, etc.

The specific embodiments mentioned above provide a detailed description of the technical solutions and beneficial effects of the present invention. It should be understood that the above are only the optimal embodiments of the present invention and are not intended to limit the present invention. Any modifications, supplements, and equivalent substitutions made within the scope of principle of the present invention should be included within the scope of protection of the present invention.

What is claimed is:

1. A method for rebuilding a relightable implicit human body model, comprising the following steps:

obtaining spatial points in a pose space based on sparse video frames, and mapping the points in the pose space back to a standard T-Pose space by using a neural skin module;

calculating implicit signed distance field values and implicit apparent eigenvectors of the points according to spatial points in the standard T-Pose space by using a neural signed distance field module;

calculating normal directions and volume densities of the spatial points according to the implicit signed distance field values of the points so as to obtain geometric information of a human body;

calculating material information of the spatial points according to the implicit apparent eigenvectors by using a bidirectional reflectance distribution function (BRDF) representation module, and converting the material information of the spatial points into material information of curved surface points of the human body;

introducing visible probes to record visibility information of each pose from a surface of the human body to a surrounding light source; representing ambient lighting information by a volumetric lighting grid comprising spherical Gaussian models; and forming an implicit human body model by the geometric information of the human body, the material information of the curved surface points of the human body, the visibility information, and the ambient lighting information.

2. The method for rebuilding a relightable implicit human body model according to claim 1, wherein the mapping the points in the pose space back to a standard T-Pose space by using a neural skin module comprises:

obtaining basic skin weights by using a skinned multi-person linear (SMPL) template, and calculating residual skin weights according to the spatial points in the pose space and a first hidden variable that needs to be learned and optimized by using a first neural network; and calculating a final skin weight for each of the video frames according to the basic skin weights and the residual skin weights, and mapping the spatial points in the pose space back to the standard T-Pose space by using the final skin weight and a transformation matrix, to obtain spatial points in the standard T-Pose space.

3. The method for rebuilding a relightable implicit human body model according to claim 1, wherein the calculating implicit signed distance field values and implicit apparent eigenvectors of the points according to points in the standard T-Pose space by using a neural signed distance field module comprises:

calculating output hidden vectors according to the spatial points in the standard T-Pose space by using a second neural network, and extracting one-dimensional vectors from the hidden vectors to serve as the implicit signed distance field values of the points, wherein vectors of other dimensions serve as the implicit apparent eigenvectors containing surface information.

4. The method for rebuilding a relightable implicit human body model according to claim 1, wherein the calculating normal directions and volume densities of the spatial points according to the implicit signed distance field values of the points so as to obtain geometric information of a human body comprises:

calculating the volume densities of the spatial points according to the implicit signed distance field values of the points by using the following formula:

$$\sigma(x') = \begin{cases} \alpha\left(1 - \frac{1}{2}\exp\left(\frac{s(x')}{\beta}\right)\right) & \text{if } s(x') < 0 \\ \frac{1}{2}\alpha\exp\left(-\frac{s(x')}{\beta}\right) & \text{if } s(x') \geq 0 \end{cases}$$

wherein $s(x')$ represents the implicit signed distance field values of the spatial points $x'$ in the standard T-Pose space, $\sigma(x')$ represents the volume densities of the spatial points $x'$, and $\alpha>0$ and $\beta>0$ both represent parameters that need to be learned.

5. The method for rebuilding a relightable implicit human body model according to claim 1, wherein the calculating material information of the human body according to the implicit apparent eigenvectors by using a BRDF representation module comprises:

dividing the spatial points in the standard T-Pose space into two parts of head spatial points and body spatial points, inputting the implicit apparent eigenvectors corresponding to the head spatial points to a high-dimensional encoder for predicting material information corresponding to the head points, inputting the implicit apparent eigenvectors corresponding to the body spatial points to a low-dimensional encoder for predicting material information corresponding to the body points, and fusing the material information corresponding to the head spatial points and the material information corresponding to the body spatial points into the material information of the spatial points.

6. The method for rebuilding a relightable implicit human body model according to claim 5, wherein both the high-dimensional encoder and the low-dimensional decoder adopt an encoding-decoding structure, the input apparent eigenvectors and the spatial points are encoded into latent code vectors by using an encoding portion, and the latent code vectors are decoded into the material information by using a decoding portion.

7. The method for rebuilding a relightable implicit human body model according to claim 1, wherein the converting the material information of the spatial points into material information of curved surface points of the human body comprises:

performing volumetric integration on the material information of the spatial points to obtain the material information of the curved surface points of the human body.

8. The method for rebuilding a relightable implicit human body model according to claim 1, wherein the introducing visible probes to record visibility information of each pose from a surface of the human body to a surrounding light source comprises:

storing the visible probes on grid nodes of an SMPL template; representing a corresponding one of the visible probes stored on each of the grid nodes as a Gaussian sum of a plurality of spherical surfaces; in each of the video frames, emitting light from each of the visible probes to all directions of the space, and performing integration on a density and a volume on a light path to calculate the visibility information; and fitting a spherical Gaussian parameter in the visible probe by using the visibility information, such that the visibility information of each motion frame is capable of being stored in the visible probe.

9. The method for rebuilding a relightable implicit human body model according to claim 1, wherein the representing ambient lighting information by a volumetric lighting grid comprising spherical Gaussian models comprises:

representing lighting as the volumetric lighting grid, with each grid node containing a spherical Gaussian mixture representation, such that a spatial point is given and local lighting of the spatial point is approximated using trilinear interpolation in the volumetric lighting grid.

10. The method for rebuilding a relightable implicit human body model according to claim 1, wherein in the process of building the implicit human body model, all parameters used need to be optimized before being applied; and a specific parameter optimization process comprises:

building a training system comprising the neural skin module, the neural signed distance field module, the BRDF representation module, a neural color module, a volume renderer, and a physical renderer, wherein the neural color module calculates color values of the spatial points according to the spatial points of the standard T-Pose space, the normal directions of the spatial points, an observation direction, the implicit apparent eigenvectors, and a second hidden variable that needs to be learned and optimized, the volume renderer draws a reconstructed image according to the color values and the volume densities of the spatial points, and the physical renderer draws a rendered image according to the implicit human body model; and training the training system based on an input video frame to optimize the parameters: firstly, performing first-stage training on the neural skin module, the neural signed distance field module, and the neural color module by using a difference value between the reconstructed image and the input video frame as a rebuilding loss; then, fixing the parameters in the first-stage training, and performing second-stage training on the BRDF representation module, the visible probe, and parameters of the spherical Gaussian models by using a difference value between the rendered image and the input video frame as a redrawing loss.

11. The method for rebuilding a relightable implicit human body model according to claim 10, wherein the process that the physical renderer draws a rendered image according to the implicit human body model comprises:

performing unbiased estimation on a rendering equation through Monte Carlo importance sampling, sampling, on this basis, a BRDF with a visible normal distribution function, and obtaining a highlight term in a rendering result through statistical calculation, which is expressed by the following formula:

$$\hat{L}_o(x_s, \omega_o) = \frac{1}{K}\sum_{k=1}^{K} \frac{L_k(x_s, \omega_k)F(x_s, h, \omega_k)G_2(x_s, \omega_k, \omega_o)}{G_1(x_s, \omega_o)}$$

wherein $\hat{L}_o(x_s, \omega_o)$ represents the highlight term of a surface point $x_s$ in a direction $\omega_o$ of emergent light, $L_i(x_s, \omega_k)$ represents lighting information of the surface point $x_s$ in a direction $\omega_k$ of incident light that is calculated by multiplying the visibility information by the ambient lighting information, $F(x_s, h, \omega_k)$ represents a Fresnel term, $G_1(x_s, \omega_o)$ represents a Smith masking function calculated according to a normal direction $n(x_s)$ of the surface point contained in the geometric information, the roughness $g(x_s)$ at the surface point $x_s$ contained in the material information, and an emergent direction, $G_2(x_s, \omega_k, \omega_o)$ represents a Smith joint masking-shadowing function calculated according to a normal of the surface point contained in the geometric information, the roughness $g(x_s)$ at the surface point $x_s$ contained in the material information, the emergent direction, and an incident direction, k represents a sampling direction, and K represents the number of rays sampled; and after the highlight term of the emergent light at the surface point $x_s$ is obtained, obtaining the rendering result of the surface point $x_s$ in combination with a diffuse reflection component $$\frac{a(x_s)}{\pi}$$

obtained from a diffuse reflectance $a(x_s)$ at the surface point $x_s$.

12. An apparatus for rebuilding a relightable implicit human body model, comprising a spatial point mapping unit, a neural signed distance unit, a geometric information building unit, a material information building unit, a visibility information building unit, an ambient lighting information building unit, and a combination unit, wherein the spatial point mapping unit is configured to obtain spatial points in a pose space based on sparse video frames, and to map the points in the pose space back to a standard T-Pose space by using a neural skin module;

the neural signed distance unit is configured to calculate implicit signed distance field values and implicit apparent eigenvectors of the points according to spatial points in the standard T-Pose space by using a neural signed distance field module;

the geometric information building unit is configured to calculate normal directions and volume densities of the spatial points according to the implicit signed distance field values of the points so as to obtain geometric information of a human body;

the material information building unit is configured to calculate material information of the spatial points according to the implicit apparent eigenvectors by using a BRDF representation module, and to convert the material information of the spatial points into material information of curved surface points of the human body;

the visibility information building unit is configured to introduce visible probes to record visibility information of each pose from a surface of the human body to a surrounding light source;

the ambient lighting information building unit is configured to represent ambient lighting information by a volumetric lighting grid comprising spherical Gaussian models; and the combination unit is configured to form an implicit human body model by the geometric information of the human body, the material information of the curved surface points of the human body, the visibility information, and the ambient lighting information.

13. A computing device, comprising a memory, a processor, and a computer program stored in the memory and executable on the processor, wherein the processor, when executing the computer program, implements the method for rebuilding a relightable implicit human body model according to claim 1.

14. A non-transitory computer-readable storage medium, having a computer program stored thereon, wherein the computer program, when executed, implements the method for rebuilding a relightable implicit human body model according to claim 1.

\* \* \* \* \*